United States Patent

Plankl et al.

[11] 3,819,400
[45] June 25, 1974

[54] SURFACE PROTECTION OF POROUS MATERIALS

[75] Inventors: Leo Hans Plankl, Rechklinghausen; Claus-Dietrich Seiler, Rheinfelden; Hans-Joachim Vahlensieck, Wehr/Baden, all of Germany

[73] Assignee: Dynamit Nobel AG, Troisdorf, Germany

[22] Filed: Oct. 19, 1971

[21] Appl. No.: 190,684

[30] Foreign Application Priority Data
Oct. 29, 1970 Germany.............................. 2053110

[52] U.S. Cl.............. 117/54, 117/123 C, 117/123 D
[51] Int. Cl........................ C04b 41/00, B08b 3/00
[58] Field of Search.............. 117/54, 123 D, 123 C; 134/34, 2, 30, 36

[56] References Cited
UNITED STATES PATENTS

| | | | |
|---|---|---|---|
| 2,015,875 | 10/1935 | Sloan | 134/34 X |
| 2,768,101 | 10/1956 | Fairchild | 134/34 |
| 3,048,499 | 8/1962 | Jellinek | 117/123 D |
| 3,065,103 | 11/1962 | Marzocchi | 117/54 |
| 3,720,538 | 3/1973 | Bergmeister | 117/123 D |

OTHER PUBLICATIONS
NACE Technical Committee Report, "Surface Preparation of Concrete for Coating," in Materials Protection, Jan. 1966, pp. 84–87.

*Primary Examiner*—William D. Martin
*Assistant Examiner*—William A. Schmidt
*Attorney, Agent, or Firm*—Ralph D. Dinklage

[57] ABSTRACT

Improvements in surface protection of porous materials, particularly water proofing masonry surfaces, by first impinging on the surface of such masonry liquid hot or cold water or steam under pressure, and then impregnating the thus treated surface with a silane of the general formula:

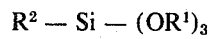

and/or a siloxane of the general formula:

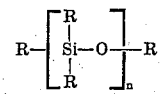

wherein:
R may be the same or different alkyl, alkenyl, aryl, cycloalkyl, cycloalkenyl, aralkyl or aralkenyl; $R^1$ is alkyl, hydroxyalkyl or alkoxyalkyl; $R^2$ is alkyl, alkenyl aryl, cycloalkyl, cycloalkenyl, aralkyl or aralkenyl; and $n$ is at least 2. The impregnant may be applied while the surface is still wet from the water or steam pretreatment.

4 Claims, No Drawings

SURFACE PROTECTION OF POROUS MATERIALS

This invention relates to the surface treating of porous materials. It more particularly refers to increasing the water repellancy of masonry surfaces.

It is known to impregnate the surface of materials containing free hydroxyl groups - in particular those containing cement and lime — with organo silicon compounds having a hydrophobic effect in order to make some more resistant to the action of the weather. The conventional treatments did not provide for a cleaning or opening of the pore areas located somewhat deeper below the surface so that the applied organo silicon compounds — either silanes in aqueous, alkaline solution, or siloxanes dissolved in organic solvents — had a penetration depth restricted to the outer surface layer interstices only. As a result, the resistance to the penetration of moisture into the material being protected was only limited.

It is, therefore, an object of this invention to provide a novel process for treating such material whereby rendering such more resistant to weathering.

Another object of this invention is to provide a novel waterproofing process for masonry materials.

Another and additional object of this invention will become apparent from a consideration of this entire specification including the claims hereof.

In accord with and fulfilling these objects, a method has now been found to achieve an improved surface protection of porous surfaces, which is characterized in that the surface is first subjected to a per se known hydromechanical treatment and is then treated with one or more organo silicon compounds having a hydrophobic effect.

It has been found that carrying out this method caused a dramatic increase in the penetration depth of the organo silicon compounds below the surface of said materials as compared to the faces not treated hydromechanically. The penetration of the hydrophobing agent into the more remote pore areas has the following additional effects:

The instantaneous resistance to penetrating moisture is improved, since the impregnated layer thickness, which has to be passed, is much bigger due to the treatment according to the invention. Furthermore, the long-term life of the impregnation is improved, since the hydrophobic agent present in the interstices which are more remote from the surface is exposed to the ambient influences action upon it in the course of time — such as e.g. UV-radiation and chemical agents — to a much lesser extent than those portions of the impregnating agent present in the outer layers of the surface.

Surprisingly it has also been found that, with respect to the surfaces treated according to the invention, water, which has frozen thereon, adheres considerably less strongly thereto than in the case of untreated surfaces. It is therefore possible to remove ice that has formed on the surfaces treated in accordance with the invention in a very simple manner, e.g. even by hand.

As organo silicon compounds there can used both silanes having the general formula $R^2 - Si(OR^1)_3$, wherein $R^1$ is an alkyl, of up to 8 carbon atoms hydroxyalkyl or alkoxyalkyl radical having 1 to 4 carbon atoms in each alkyl moiety and $R^2$ is alkyl, alkenyl, aryl, cycloalkyl, cycloalkenyl, aralkyl or aralkenyl radical, and siloxanes having the general formula

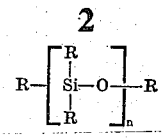

wherein R represents any same or different alkyl, alkenyl, aryl, cycloalkyl, cycloalkenyl, aralkyl or aralkenyl radicals and $n$ is more than 2.

Alkyl groups according to this invention are preferably lower alkyl groups having up to about 8 carbon atoms in straight or branched chain configuration. Exemplary alkyl groups are methyl, ethyl, propyl, butyl, isopropyl, 2-ethylhexyl, n-octyl and the like.

Alkenyl groups according to this invention are preferably lower alkenyl groups having up to about 8 carbon atoms in straight or branched chain configuration with one or more sites of ethylenic unsaturation at some point in the molecule. Exemplary alkenyl groups are vinyl, allyl, crotyl, propenyl, iso-propenyl, 2-ethylhexenyl, butadienyl and the like.

Cycloalkyl groups according to this invention are preferably groups having 4 to 8 carbon atoms in the ring, such as cyclobutyl, cyclohexyl or cyclooctyl, which rings may have one or more inert substituents, e.g. alkyl groups, thereon. The substituents are preferably lower alkyl of up to about 8 carbon atoms such as methyl, ethyl, propyl, n-hexyl, n-octyl, etc., and there may be as many such substituents as there are hydrogen atoms to be replaced on the ring carbon atoms.

Cycloalkenyl groups according to this invention are in all respects similar in definition to the cycloalkyl groups set forth above except that they have one or more sites of ethylenic unsaturation in the ring. Such cycloalkenyl rings are exemplified by cyclobutenyl, cyclohexadienyl and cyclooctatetraenyl. The number of possible alkyl substituents on the ring is again equal to the number of replaceable hydrogen atoms on the ring carbon atoms.

Aryl groups according to this invention are mono, di or tricyclic, preferably monocyclic. They are exemplified by phenyl, naphthyl, diphenyl, phenyl methyl phenyl groups and the like. The rings may be fused or unfused and may have one or more inert substituents thereon such as alkyl groups, particularly lower alkyl groups of up to 8 carbon atoms such as methyl, ethyl, propyl, 2-ethyl hexyl, etc.

The aryl portion of the aralkyl and aralkenyl substituent groups are as defined above. The alkyl and alkenyl portions of these groups are likewise as defined above.

Alkoxy groups and hydroxyalkyl groups according to this invention generally conform, at least insofar as the alkyl portion thereof is concerned, to the definition of alkyl groups as set forth above.

According to this invention, $n$ is preferably 2 to 100.

Examples of the aforementioned silanes are ethyl-, butyl, or hexyl-trimethoxysilane, methyl-, ethyl-, propyl- or butyl-tris-(2-methoxy-ethoxy)-silane, tris(2-ethoxy-ethoxy)-silane, phenyltriethoxysilane and cresyltriethoxysilane.

The preparation of these silanes is accomplished by generally known methods.

The silanes are preferably used either as aqueous, alkaline solutions or dissolved in a $C_2-C_4$ alkanol. Aqueous alcoholic solutions may also be employed.

As siloxanes there may be used both compounds of low molecular weight wherein the number of siloxane units

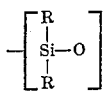

is less than 10 and compounds of higher molecular weight wherein the number of such units is more than 10. As compounds of lower molecular weight, preferably the compounds formed by partial hydrolysis of the aforementioned alkoxysilanes are utilized. But the use of e.g. hexamethyl disiloxane, hexaphenyl disiloxane, dimethyltetraphenyl disiloxane, tetramethyldiphenyl disiloxane or the corresponding ethyl-, methyl- butyl-, ethyl-phenyl siloxanes is also possible.

As siloxanes of higher molecular weight, the compounds formed by partial hydrolysis and subsequent condensation of the aforementioned alkoxysilanes or of chlorsilanes may be used; but it is also possible to employ polysiloxanes made in a different manner. Exemplary of the multitude of the products, which can be made in this way and used, according to this invention are α, ω-bis-trimethylsiloxypolydimethyl siloxane, α, ω-bis-trimethylsiloxypolydiphenyl siloxane, α, ω-bis-dimethylvinylsiloxypolydimethyl siloxane, and α, ω-bis-triethylsiloxypolydiphenyl siloxane. It is understood that mixtures of siloxanes may also be utilized.

Where siloxanes are used they should be dissolved in a suitable organic solvent.

The quantity of silane or siloxane compounds to be applied to the pretreated surface depends to a great extent upon the specific structure of the substrate and upon the degree of hydrophobicity desired. Good results are obtained when using quantities as low as 200 g/m² of a 10% by weight silane or siloxane treating solution. But the solutions of the organo-silicon compounds may also be more concentrated or more diluted. It is of advantage to use 5 to 20 percent by weight solutions. If the impregnating solution is repeatedly applied, each solution used may have less than 5 percent by weight silicon organic compounds.

The hydromechanical pretreatment of the surface to be impregnated according to this invention is carried out with either cold or hot water or with superheated steam, preferably under pressure. Preferably, the processes known as high-pressure cold water process and steam jet process are employed.

In the high-pressure cold water process the water may have a temperature up to 80°C, preferably 60°C. It is applied under pressure which depends on the surface condition of the material, such as e.g. degree of contamination, and on the nature of the medium (e.g. natural stones, artificial stones, concrete surfaces, etc.) If possible, the applied pressure should be more than 10 atmospheres. The pressure to be applied does not have any upper limit. Pressures up to 750 atmospheres can be used without any difficulty. The maximum pressure depends on the load the porous material being treated can withstand without being damaged.

It is understood that surfactants such as soaps or detergents, which reduce the surface tension of the water, may be added to the treating water. As detergents there may be used anion-active, cation-active or nonionic surfactants. The additional use of sand blasting the surface being water proofed is also possible. Such surfactants should be used in a proportion of about 0.01 percent to 2.0 percent by weight.

In the steam jet process the material is treated with superheated steam which is under pressure. For this purpose the water is heated and compressed in appropriate aggregates, such as marketed, for instance, by the U.S. company Malsbary Manufacturing Co., Oakland, Calif., under the name HPC-Malsbary Aggregates, and leaves via an appropriate nozzle in the form of superheated steam under pressure. Inside the engine system of the aggregate the temperature of the water is at least about 150°C, and it should be compressed by a compresser to 20 atmospheres, if possible. The water weight rate of flow at the inlet opening of the engine system should not be less than 1,200 liters per minute, if possible.

As in the case of the high-pressure water process it is possible to additionally use sand blasting and/or surfactants.

If, following the high-pressure cold water treatment and/or the steam jet process, siloxanes are used as impregnating agents, care has to be taken to dry the treated surface prior to the application of the impregnating agent.

Thus far, the two aforementioned processes that is, the hot or cold water and/or steam treatment, have been used only to clean surfaces. The surfaces to be impregnated according to this invention may be pretreated with other similar cleaning methods prior to impregnation.

In accordance with the invention, porous materials are understood to mean all inorganic oxidic materials which, in one form or another, comprise components containing free available hydroxyl groups, to which Si-O- bonds can be linked, and which have a porous surface. This group comprises materials containing cement and/or lime, in particular exterior plaster finishes of facade walls or concrete surfaces of roads or runways. Materials from aluminum oxide and titanium dioxide or mixtures of these oxides with silicate-containing materials are contained in this group as well, such as e.g. masonry, bricks, roofing tiles, natural and artificial stones and macadam, which have a certain capillary structure and, therefore, are absorbent.

This invention will be illustrated by the following Examples which are non-limiting.

EXAMPLE 1:

A factory-made, dry concrete slab (dimensions 10 × 10 × 2 cm), which had been stored in the open air for about one year, was impregnated without prior hydromechanical treatment by evenly brushing on a given quantity, equivalent to 250 ml/m², of a 20 percent solution of butyltrimethoxysilane in ethanol on both faces (slab 1). A second, identical concrete slab was treated on all faces with steam at a pressure of 20 atmospheres by passing the outlet nozzle of a high-pressure steam producing unit several times directly over the entire surface (distance between nozzle and surface; 5 cm); treatment duration per face approx. 5 seconds. The slab was permitted to dry for 25 hours whereupon it was treated with the same quantity of the above recited silane solution (slab 2). A third identical slab was treated with the above recited silane solution after the identical steam treatment and only half hour drying time (that is, it was still wet) (slab 3).

The slabs were permitted to stabilize for 72 hours after completion of the silane impregnation whereupon each was placed into a tank containing water to a height of 10 cm. The slabs were weighed every 24 hours after wiping off the water adhering to the surface.

| Water Absorption (in Grams) of the Slab | after | 24 | 72 | 120hrs |
|---|---|---|---|---|
| Slab 1 | | 2 | 8 | 14 |
| Slab 2 | | 2 | 4 | 8 |
| Slab 3 | | 2 | .5 | 9 |

The slabs were placed into a freezing chamber in a state of surface wetness so that a thin ice layer formed on the surface. It was much more difficult to remove this ice layer mechanically from slab 1 than it was from slabs 2 and 3.

Finally, the three slabs were shattered. It was found that, in the case of slab 1, the organosilicon impregnating agent had penetrated to a depth of approximately 2 mm. On the other hand it had penetrated to a depth of 4 to 5 mm in slabs 2 and 3.

EXAMPLE 2:

Following a steam jet treatment by means of the steam jet apparatus HPC of the U.S. company Malsbary, cement portions of a highway bridge were brushed with a 40% siloxane solution consisting predominantly of butyl siloxane and propyl siloxane, in a wet on wet application. Following a naturally occurring snow and frost, only a slight amount of snow and ice was frozen onto the surfaces treated as described above. This layer could be removed with very simple means (e.g. by striking with the flattened back of the hand). On the other hand, surfaces of the same type, which had not been treated according to this invention, and even those which had been impregnated with epoxy resin permitted snow and ice to strongly adhere thereto. The ice could be removed only with difficulty.

What is claimed is:

1. A process for preventing the adhesion of ice layers on a concrete surface which comprises first subjecting said surface to a thermo-hydromechanical treatment by impingeing hot water or steam under pressure thereon and then impregnating, while the surface is still wet with water from said thermo-hydromechanical treatment, a liquid form organosilane of the formula:

$$R^2-Si-(OR^1)_3$$

wherein $R^2$ is selected from the group consisting of alkyl of up to 8 carbon atoms, alkenyl of up to about 8 carbon atoms, cycloalkyl of about 4 to 8 carbon atoms in the ring, cycloalkenyl of about 4 to 8 carbon atoms in the ring, aryl of 1 to 3 fused or unfused rings, aralkyl of 1 to 3 fused or unfused rings in the aryl portion and up to about 8 carbon atoms in the alkyl portion and aralkenyl of 1 to 3 fused or unfused rings in the aryl portion and up to about 8 carbon atoms in the alkenyl portion; and $R^1$ is a member selected from the group consisting of alkyl of 1 to 8 carbon atoms, hydroxyalkyl of 1 to 8 carbon atoms and alkoxy alkyl of 1 to 4 carbon atoms in each of the alkyl and alkoxy portions thereof, said organosilane dissolved in a $C_2$-$C_4$ alkanol.

2. A process according to claim 1 wherein said steam is under pressure of at least 10 atmospheres and the water employed in the thermo-hydromechanical process has at least one surfactant admixed therewith.

3. A process according to claim 2 wherein said organosilane is at least one member selected from the group consisting of ethyl trimethoxysilane, butyl trimethoxysilane, hexyl trimethoxysilane, methyl tris (2-methoxy ethoxy) silane, ethyl tris (2-methoxy ethoxy) silane, propyl tris (2-methoxy ethoxy) silane, butyl tris (2-methoxy ethoxy) silane, methyl tris (2-ethoxy ethoxy) silane, ethyl tris (2-ethoxy ethoxy) silane, propyl tris (2-ethoxy ethoxy) silane, butyl tris (2-ethoxy ethoxy) silane, phenyl triethoxysilane and cresyl triethoxysilane.

4. A process according to claim 3 wherein the liquid form impregnants constitute 5 to 20 weight percent solutions of the organo silicon compound.

* * * * *